July 1, 1924.
I. W. LITCHFIELD
1,499,584
TOOL FOR DRILLING OR BORING METALS
Filed Oct. 7, 1920 2 Sheets-Sheet 1
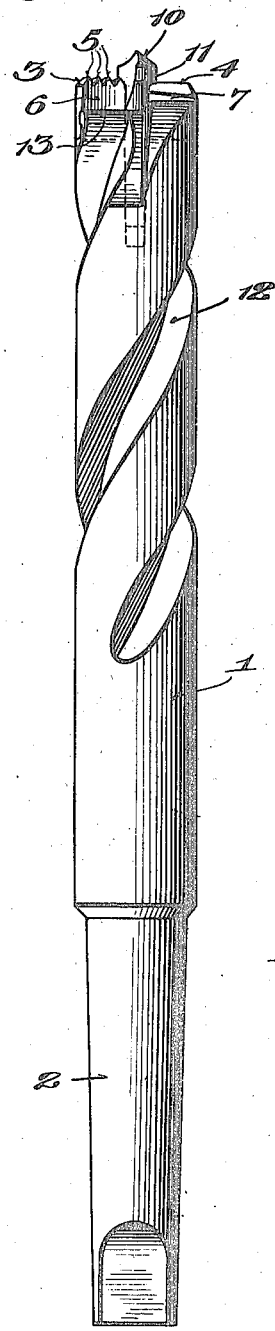
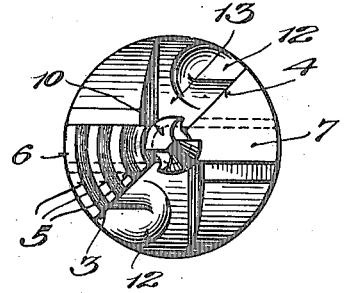
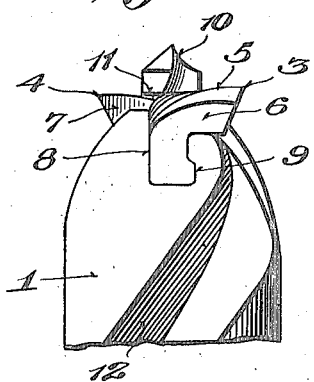
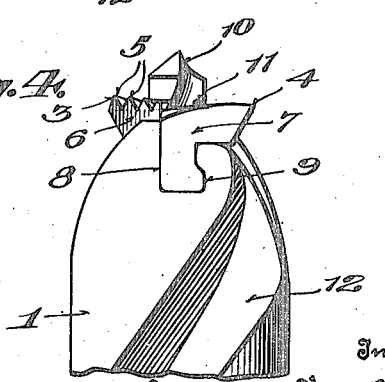

July 1, 1924.  
I. W. LITCHFIELD  
TOOL FOR DRILLING OR BORING METALS  
Filed Oct. 7, 1920  
1,499,584  
2 Sheets-Sheet 2
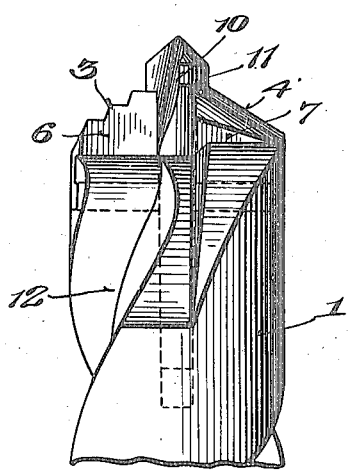
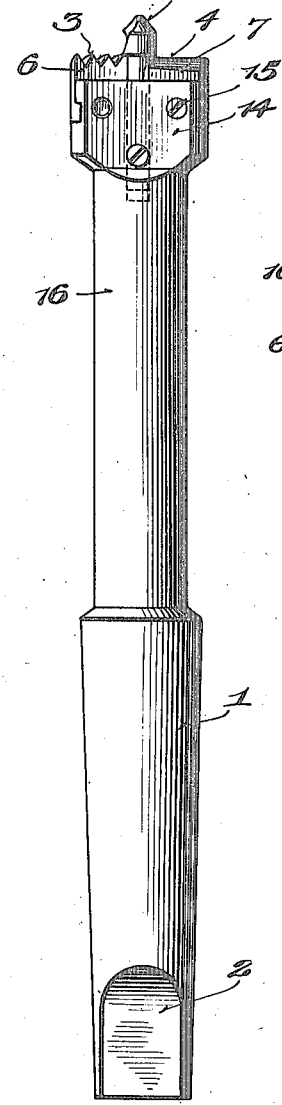
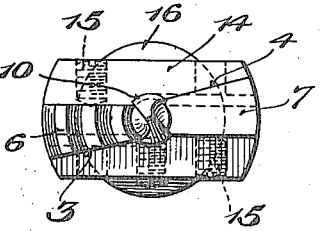
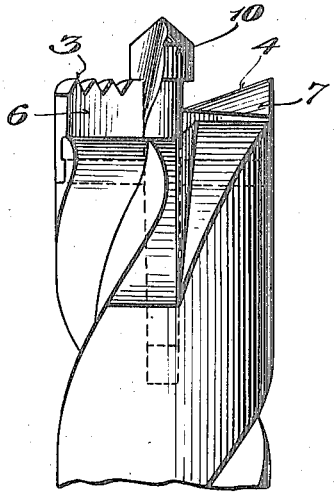
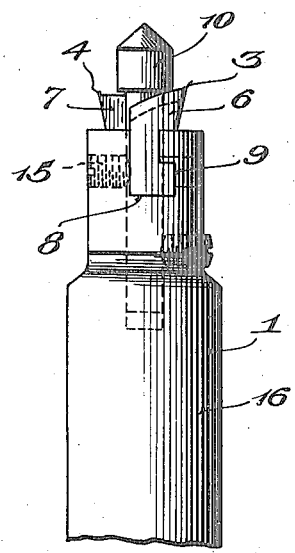
Isaac W. Litchfield, Inventor
By Mauro, Cameron, Lewis & Massum
Attorneys Patented July 1, 1924.

1,499,584

UNITED STATES PATENT OFFICE.

ISAAC W. LITCHFIELD, OF NEWTONVILLE, MASSACHUSETTS.

TOOL FOR DRILLING OR BORING METALS.

Application filed October 7, 1920. Serial No. 415,429.

*To all whom it may concern:*

Be it known that I, ISAAC W. LITCHFIELD, a citizen of the United States, and a resident of Newtonville, Massachusetts, have invented new and useful Improvements in Tools for Drilling or Boring Metals, which invention is fully set forth in the following specification.

This invention relates to tools for drilling metal, and it has for an object to provide a tool of this character which will operate with greater speed and higher efficiency than tools heretofore provided.

The conventional twist drill, owing to the length of its cutting edge, is in reality more of a scraper than a cutter in operation, whereby its progress through the metal is necessarily slow. To obviate this defect it has heretofore been suggested to notch the cutting edges of a twist drill, the notches in one cutting edge being staggered with respect to the notches in the other cutting edge so that the following cutting edge will cut off the ridges left by the notches in the advancing cutting edge. Tools of this character are exceedingly difficult to sharpen as they require special grinders and, owing to the different spacing of the notches in the two edges, separate grinders for each edge are necessary.

It is an object of this invention to provide a tool for drilling metal which operates more nearly as a cutter while, at the same time, avoiding difficulties heretofore experienced in notching the edges of twist drills.

Another object of this invention is to provide a tool for drilling metal which is provided with an interrupted cutting edge and an uninterrupted cutting edge adapted to follow said interrupted cutting edge and cut off the ridges left by the interruptions therein, said uninterrupted cutting edge being positioned axially to the rear of the interrupted cutting edge so as to produce a balanced cut.

Another object of this invention is to provide a tool of the type characterized with a pilot portion whereby the tool may be accurately centered or the metal at the axis removed.

Another object of the invention is to provide a tool of the type characterized with a removable cutter portion whereby the shank portion may be made of a lower grade of steel than required for the cutting edges and whereby the cutters may be readily withdrawn for resharpening or replacement.

Another object of the invention is to provide the shank of a tool of the type characterized with means to facilitate the egress of the chips. Other objects will appear as the description of the invention proceeds.

Stated broadly, the invention comprises a tool for drilling metal having an interrupted cutting edge and an uninterrupted cutting edge adapted to follow said first-mentioned edge and remove the ridges left by the interruptions therein, said uninterrupted cutting edge being positioned axially to the rear of said interrupted cutting edge sufficiently to balance the amounts of metal which will be removed by the respective cutting edges. Said cutting edges are preferably provided on removable cutters suitably held in position in a shank portion, said shank portion desirably being provided with flutes to facilitate the egress of chips. Said tool may be provided with a pilot portion projecting forwardly in the axis of the tool either to guide the progress of the tool when a centering hole has first been provided or to drill a hole in advance of the main cutting edges and remove the metal at the axis in advance of the latter.

The invention is capable of receiving a variety of mechanical expressions some of which are shown on the accompanying drawings, but it is to be expressly understood that the drawings are for purposes of illustration only and are not to be construed as a definition of the limits of the invention, reference being had to the appended claims for that purpose.

In said drawings, wherein the same reference characters are employed to designate corresponding parts in the several figures:—

Fig. 1 is an elevation of a tool for drilling metal constructed in accordance with the present invention;

Fig. 2 is an enlarged end view thereof;

Fig. 3 is an enlarged side view of said tool looking in the direction of the interrupted cutting edge;

Fig. 4 is an enlarged side view of said tool looking in the direction of the uninterrupted cutting edge;

Fig. 5 is an enlarged side view of an embodiment of the present invention wherein both of the cutting edges are inclined to the axis of the tool;

Fig. 6 is an enlarged side view of an embodiment of the present invention wherein only one of the cutting edges is inclined to the axis of the tool;

Fig. 7 is an elevation of another embodiment of the present invention employing a reduced shank;

Fig. 8 is an enlarged end view of the embodiment of Fig. 7; and

Fig. 9 is an enlarged side view of the embodiment of Fig. 7 taken at right angles to said last-named figure.

In the form shown in Figs. 1 to 4 the drill comprises a shank portion 1, suitably formed, as shown at 2, to fit into any desired tool holder, and provided at its end with two cutting edges 3 and 4, the former of which is provided with interruptions and the latter of which is uninterrupted. In the embodiment illustrated, the interrupted cutting edge is provided by forming notches 5 in said edge so as to give the appearance of a plurality of teeth. The uninterrupted cutting edge is positioned axially to the rear of the interrupted cutting edge so as to remove the ridges left by the interdental spaces of the cutting edge 3. The distance to which the line of the uninterrupted cutting edge is positioned to the rear of the line of the interrupted cutting edge will vary slightly with different metals to be operated upon and different sizes and speeds of the tool, but I have found that 1/64 of an inch to 1/32 of an inch is a suitable spacing of said cutting edges. The cutting edges which thereby have the capacity of doing substantially the same amount of work by removing substantially equal amounts of metal are ground to provide a suitable clearance and their advancing faces are preferably plain surfaces having a suitable rake.

In order to facilitate sharpening of the cutting edges and to enable replacement when badly worn, the cutting edges are preferably provided on removable cutters 6 and 7, in which event the shank 1 may be made of low grade steel. The removable cutters 6 and 7 may be held in position in any suitable way. In the form shown, the shank 1 is provided in its end with a transverse groove 8 having an undercut extension 9 and the cutters are shaped to interlock in the groove so formed. It is to be expressly understood, however, that the groove and cutters may be of dove-tailed or any other suitable shape adapted to retain the cutters securely in position.

The tool of the present invention may also be provided with a pilot portion 10 which in turn may be either a plain pilot portion (see Fig. 9) projecting forwardly in the axis of the tool for engagement in a previously formed hole to center and guide the progress of the tool, or a pilot drill that will itself form a pilot hole in advance of the tool. Said pilot portion is preferably made removable and may be retained in position in any suitable way. The head of said pilot portion is preferably provided with a shoulder 11 which is adapted to overhang the inner ends of the cutting edges so as to prevent the formation of a fin at the junction of the cutting edges and the pilot portion.

To facilitate the egress of chips the shank 1 may be provided with spiral flutes 12 and the entrance to said flutes may be so shaped as to provide a shoulder or baffle 13 against which the chips will impinge and become broken.

In the embodiment of Figs. 1 to 4 the two cutting edges are positioned so that they lie at right angles to the axis of the tool. This is not essential, however, as one or both of the cutting edges may be inclined either inwardly or outwardly with respect to the axis of the tool. In the embodiment of Fig. 5 both cutting edges are inclined outwardly with respect to the axis of the tool while in the embodiment of Fig. 6 the uninterrupted cutting edge is inclined inwardly with respect to the axis of the tool. In both of these latter embodiments it will be perceived that the uninterrupted cutting edge is positioned axially to the rear of the interrupted cutting edge, and in the embodiment of Fig. 5 (as in the embodiment of Figs. 1 to 4) the surface described by the uninterrupted cutting edge lies parallel to but axially at the rear of the surface described by the interrupted cutting edge.

In the embodiment of Figs. 7 to 9 the tool is provided with a flattened head 14 having a longitudinal groove in which the inserted cutters interlock. Said cutters may be retained against longitudinal displacement in said grooves by pointed screws 15, received in threaded apertures in said head 14, and projecting into engagement with said cutters. Instead of providing the shank with flutes it may be reduced in diameter as shown at 16 to provide a clearance for the egress of chips.

It will therefore be perceived that I have provided a tool for drilling metal which will operate as a cutter, the same having an interrupted cutting edge and an uninterrupted cutting edge positioned axially to the rear of said interrupted cutting edge and thus adapted to follow and remove the ridges left by said interrupted cutting edge while at the same time providing a balanced cut. It will also be perceived that I have provided a tool as just characterized whereby the shank may be made of low grade steel and the cutters may be readily inserted and withdrawn for regrinding or replacement. Furthermore, the tool, if desired, may be provided with either a plain or a drilling pilot to center and guide the tool and remove the metal at the axis, particularly if of a large size. Also the shank of the tool is so constructed as to facilitate the egress of chips, which may be broken up immediately after leaving the cutting edges.

While the embodiments of the invention shown on the drawings have been described with considerable particularity it is to be expressly understood that the invention is not limited to the same as it is capable of receiving a variety of mechanical expressions some of which will be now readily suggested to those skilled in the art. Changes may also be made in details of construction and arrangement of parts without departing from the spirit of this invention. Reference is therefore to be had to the claims hereto appended for a definition of the limits of said invention.

What is claimed is:

1. A drill having an interrupted cutting edge and an uninterrupted cutting edge adapted to follow said interrupted cutting edge and remove the ridges left by the interruptions therein, the uninterrupted cutting edge being axially to the rear of said interrupted cutting edge sufficiently to produce a balanced cut.

2. A drill having an interrupted cutting edge and an uninterrupted cutting edge adapted to follow said interrupted cutting edge and remove the ridges left by the interruptions therein, the uninterrupted cutting edge being axially to the rear of said interrupted cutting edge sufficiently to produce a balanced cut and at least one of said cutting edges being inclined to the axis of the drill.

3. A drill having a notched cutting edge and a straight cutting edge axially to the rear of said notched cutting edge and so positioned that the effective length of the straight cutting edge is approximately equal to the effective length of the notched edge.

4. A drill having an interrupted cutting edge, an uninterrupted cutting edge axially to the rear of said interrupted cutting edge sufficiently to produce a balanced cut, and a pilot projecting forwardly in the axis of the drill and adapted to form a central hole in advance of said cutting edges.

5. A drill having a notched cutting edge, a straight cutting edge axially to the rear of said notched cutting edge and so positioned that the effective length of the straight cutting edge is approximately equal to the effective length of the notched cutting edge, and a pilot projecting forwardly in the axis of the drill.

6. A drill having a shank provided with a transverse groove in the end thereof and removable cutters in said groove, said groove and cutters being formed to provide an interlock, one of said cutters having an interrupted cutting edge and the other of said cutters having an uninterrupted cutting edge adapted to follow said interrupted cutting edge, said uninterrupted cutting edge being axially to the rear of said interrupted cutting edge.

7. A drill having an interrupted cutting edge and an uninterrupted cutting edge axially to the rear of said interrupted cutting edge sufficiently to do substantially the same amount of work in removing metal as is done by said interrupted cutting edge.

8. A drill having an interrupted cutting edge, an uninterrupted cutting edge axially to the rear of said interrupted cutting edge sufficiently to do substantially the same amount of work in removing metal as is done by said interrupted cutting edge and a pilot projecting forwardly in the axis of the drill.

In testimony whereof I have signed this specification.

ISAAC W. LITCHFIELD.